Aug. 21, 1928.
C. C. FARMER
BRAKE CYLINDER
Filed March 25, 1927
1,681,579
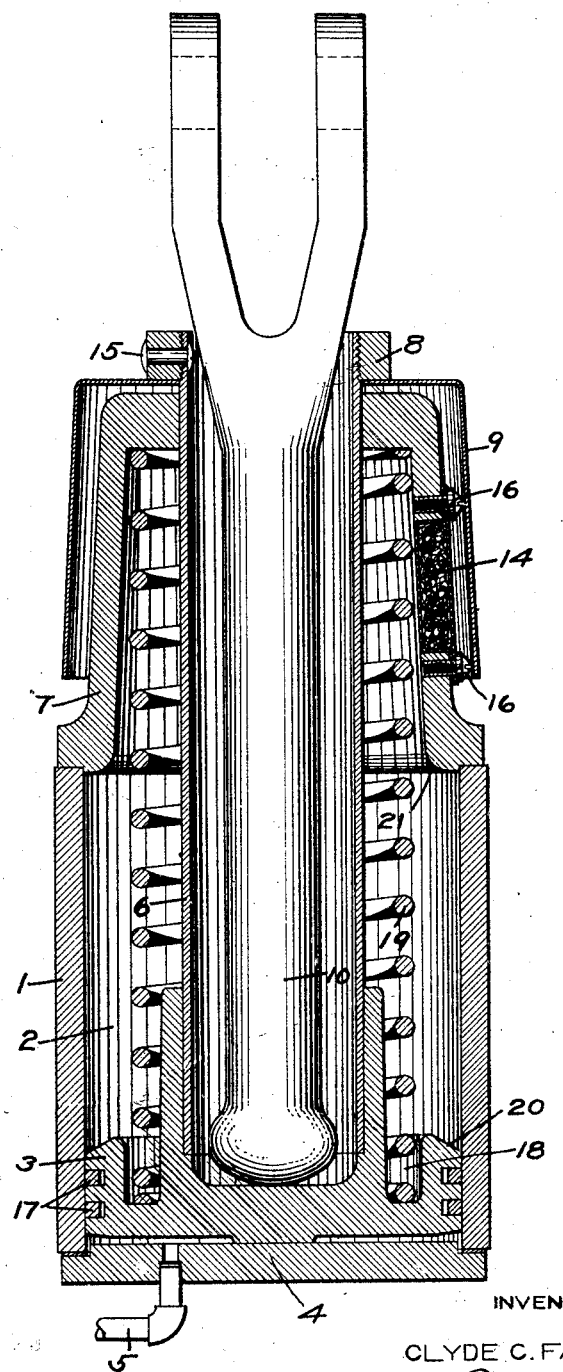
INVENTOR
CLYDE C. FARMER.
BY Wm. N. Cady
ATTORNEY Patented Aug. 21, 1928.

1,681,579

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE CYLINDER.

Application filed March 25, 1927. Serial No. 178,307.

This invention relates to fluid pressure motor devices, and more particularly to a cylinder and piston construction of the type employed as brake cylinders in fluid pressure brake systems.

In cases where the cylinder and piston construction is mounted in a vertical position, as when employed as a motor device on dump cars, dirt or other foreign matter is liable to find its way into the cylinder, and if the usual leather or composition piston packing ring is employed, the packing ring is subjected to excessive wear, as well as the cylinder walls. In addition, packing rings of leather or composition material do not stand up well under high temperatures, to which the cylinders are sometimes subjected.

The principal object of my invention is to provide means for overcoming the above difficulties.

In the accompanying drawing, the single figure is a sectional view of a fluid pressure cylinder and piston construction embodying my invention.

As shown in the drawing, the motor device comprises a cylinder 1, having a piston chamber 2 containing a piston 3, and is provided with a pressure head 4 at one end, having an opening connected to a pipe 5 through which fluid under pressure is supplied to and released from the cylinder. To the other end of the cylinder is secured a non-pressure head 7.

A hollow piston rod 6 is centrally secured to the piston 3 and slidably extends through a bore in the closed end of the cylinder non-pressure head 7.

In order to prevent dirt and foreign matter from entering the cylinder, I provide a shield 9, preferably cup-shaped, to the central portion of the end face of which is secured a ring 8, by brazing or otherwise. Said ring is interiorly threaded and is adapted to have screw-threaded engagement with the outer end of the hollow piston rod 6. The shield 9 is of sufficient diameter to permit the non-pressure head to project into same, when the piston 3 is in the release position, as shown in the drawing; but is not permitted to engage the non-pressure head, when the piston 3 strikes the pressure head 4. After adjusting the position of the shield 9 and ring 8 on the piston rod 6, the ring is secured against further movement by a rivet 15 through the ring 8 and piston rod 6.

A push rod 10 is provided inside the hollow piston rod 6 and has formed at its outer end a yoke, between the arms of which an operating lever (not shown) is secured.

An opening is provided in the wall of the non-pressure head 7 and held in said opening is an air strainer 14, comprising two perforated plates forming an intermediate chamber, which is filled with pulled curled hair, the strainer being secured to the wall of the non-pressure head by screws 16.

The piston 3 is formed with two peripheral grooves, each containing a piston ring 17 engaging the inner wall of the cylinder 2 and on the back of the piston is formed an annular groove 18, in which one end of the usual piston return spring 19 seats. The opposite end of the spring 19 seats against the inside wall of the closed end of the non-pressure head 7.

On the back of the piston 3, adjacent the annular groove 18, is a chamfered surface 20 adapted to engage the arcuate surface 21 of the non-pressure head 7, when the piston 3 is in application position.

In operation, fluid under pressure is supplied through pipe 5 to the face of the piston 3, thereby shifting the piston, piston rod 6 and push rod 10 upwardly against the pressure of the spring 19. This upward movement of the piston 3 tends to compress the fluid at atmospheric pressure back of the piston, but due to the atmospheric connection through the strainer 14, the fluid back of the piston is ejected into the atmosphere, thereby maintaining substantially atmospheric pressure in the spring chamber back of the piston.

In order to prevent the piston rings 17 from becoming inoperative by being jammed in their grooves by the impact of the piston 3 striking the non-pressure head 7, the chamfered surface 20 on the back of the piston is adapted to engage the curved surface 21 on the non-pressure head, on a line of less diameter than the diameter at the bottom of the ring grooves, so that the full force of the impact is received by the piston back of the ring grooves, where the full thickness of the piston is present.

When the fluid under pressure acting on the piston 3 is vented to the atmosphere through pipe 5 to some low degree, the pressure of the spring 19 starts to move the piston and piston rod downwardly.

When the piston moves towards its normal release position, as shown in the drawing, the pressure in the spring chamber back of the piston tends to be reduced below that of the atmosphere but is substantially maintained at atmospheric pressure by the flow of fluid from the atmosphere through the strainer 14. The strainer 14 thus prevents any dirt or foreign matter from entering the cylinder.

It will be noted that the shield 9 moves with the hollow piston rod 6, but in both extreme positions of the piston, the shield 9 prevents falling or shifting dirt or foreign matter from coming in contact with the piston rod 6 and then being drawn into the interior of the non-pressure head through the clearance existing between the piston rod 6 and the bore in the closed end of the non-pressure head 7, through which the piston rod operates.

Having now described my invention, what I claim as new and desire to secure by Letters Patent, is:—

1. The combination with a cylinder having a non-pressure head, a fluid pressure controlled piston in said cylinder, and a piston rod connected to said piston and extending through an opening in said non-pressure head, of a dirt shield secured at the outer end of said piston rod and an air strainer disposed in an opening in said non-pressure head, said strainer being covered by said shield when the piston is retracted.

2. The combination with a cylinder having a non-pressure head, a fluid pressure controlled piston in said cylinder, and a piston rod connected to said piston and extending through an opening in said non-pressure head, of an interiorly threaded ring and a cup-shaped dirt shield secured to said ring, said ring having screw-threaded engagement with the outer end of said piston rod.

3. The combination with a fluid pressure cylinder having a non-pressure head provided with an annular arcuate face, of a piston in said cylinder provided with grooves for piston rings and having a chamfered inner face adapted to engage said arcuate face.

4. The combination with a fluid pressure cylinder having a non-pressure head provided with an annular arcuate face, of a piston in said cylinder provided with grooves for piston rings and having a chamfered inner face adapted to engage said arcuate face, the line of contact being such that the force of impact is transmitted through the solid metal of the piston at the rear of the grooves.

In testimony whereof I have hereunto set my hand.

CLYDE C. FARMER.